United States Patent
Chen et al.

(10) Patent No.: US 12,047,533 B2
(45) Date of Patent: Jul. 23, 2024

(54) SPAMMER LOCATION DETECTION

(71) Applicant: AT&T Intellectual Property I, L.P., Atlanta, GA (US)

(72) Inventors: Jie Chen, Watchung, NJ (US); Ye Ge, Holmdel, NJ (US); Wenjie Zhao, Princeton, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 347 days.

(21) Appl. No.: 17/409,456

(22) Filed: Aug. 23, 2021

(65) Prior Publication Data
US 2023/0054460 A1    Feb. 23, 2023

(51) Int. Cl.
*H04M 3/436*  (2006.01)
*H04M 1/66*  (2006.01)
*H04W 12/128*  (2021.01)

(52) U.S. Cl.
CPC ............. *H04M 3/436* (2013.01); *H04M 1/66* (2013.01); *H04W 12/128* (2021.01)

(58) Field of Classification Search
CPC ...... H04M 3/436; H04M 1/66; H04M 3/2215; H04W 12/128
USPC ........................................................ 455/415
See application file for complete search history.

(56) References Cited

U.S. PATENT DOCUMENTS

| | | | |
|---|---|---|---|
| 5,844,522 A * | 12/1998 | Sheffer ............... | G08B 25/009 340/8.1 |
| 11,032,665 B1 | 6/2021 | George et al. | |
| 2010/0159957 A1* | 6/2010 | Dando .................. | H04W 64/00 455/456.5 |
| 2010/0323723 A1* | 12/2010 | Gerstenberger ...... | G01S 5/0226 455/456.5 |
| 2014/0004892 A1* | 1/2014 | Murynets ................ | H04W 4/14 455/466 |
| 2018/0270621 A1* | 9/2018 | Mappus ................ | G01S 5/0027 |

OTHER PUBLICATIONS

Jie Chen et al., "User Equipment Geolocation Using a History of Network Information," U.S. Appl. No. 17/409,246, filed Aug. 23, 2021, 52 pages.

\* cited by examiner

*Primary Examiner* — Ahmad F. Matar
*Assistant Examiner* — Jirapon Tulop
(74) *Attorney, Agent, or Firm* — Guntin & Gust, PLC; John G. Rauch

(57) ABSTRACT

The described technology is generally directed towards spammer location detection, and in particular, to locating a spammer that makes multiple calls from a given location via a cellular communications network. In some examples, network equipment can obtain call trace records associated with the multiple calls, identify a group of call trace records based on a shared call trace feature, aggregate data from call trace records within the group, and determine an estimated location based on the aggregated data.

20 Claims, 9 Drawing Sheets

802
Aggregating data from different call trace records within a group of call trace records, resulting in aggregated data, wherein the aggregated data comprises identifications of serving cells.

804
Determining an estimated location based on the aggregated data, wherein determining the estimated location comprises determining an overlap region based on the serving cells.

FIG. 8

902
Determining an estimated location based on first aggregated data, wherein the first aggregated data is based on different call trace records comprising a shared call trace feature.

904
Enabling deployment of a mobile base station towards the estimated location in order to obtain additional call trace records comprising the shared call trace feature.

906
Including the additional call trace records in the first aggregated data, resulting in second aggregated data.

908
Refining the estimated location based on the second aggregated data.

FIG. 9

SPAMMER LOCATION DETECTION

TECHNICAL FIELD

The subject application is related to spammer location detection in cellular communication systems, for example, using geolocation of user equipment that communicate via fourth generation (4G), fifth generation (5G), and subsequent generation cellular networks.

BACKGROUND

Unwanted "spam" calls are a problem for many telephone users. Spam calls can also be a problem for government agencies, businesses, or other organizations, particularly those that use human operators to answer calls. Such organizations have limited resources to answer a volume of calls, and these resources can be drained by spam calls, resulting in extra costs and degraded customer service. The problem is even more pressing in the case of emergency services, such as 911, where protocols may require additional attention to each incoming call, and where there are potentially high consequences when the service is temporarily slowed or stopped due to spam calls.

Spam callers are increasingly using cellular network user equipment (UE), such as mobile telephones. There is a need in the industry for tools to assist with thwarting spam callers.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 8 is a flow diagram representing another set of example operations of network equipment in connection with determining an estimated location of an originator of spam calls, in accordance with various aspects and embodiments of the subject disclosure.

FIG. 9 is a flow diagram representing example operations of network equipment in connection with deploying a mobile cell to determine an estimated location of an originator of spam calls, in accordance with various aspects and embodiments of the subject disclosure.

DETAILED DESCRIPTION

Figure 1:
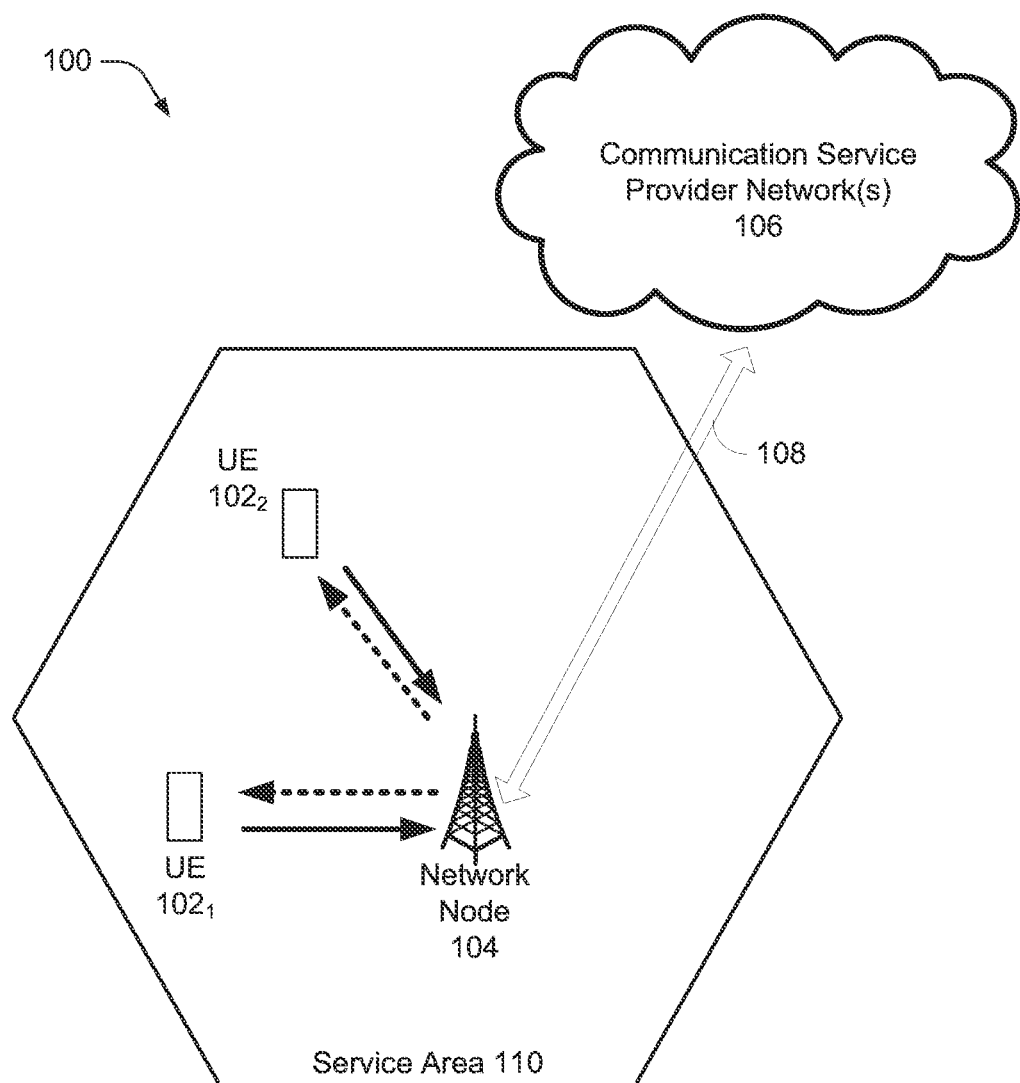
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards spammer location detection, and in particular, to locating a spammer that makes multiple calls from a given location via a cellular communications network. In some examples, network equipment can obtain call trace records associated with the multiple calls, identify a group of call trace records based on a shared call trace feature, aggregate data from call trace records within the group, and determine an estimated location based on the aggregated data. Further aspects and embodiments of this disclosure are described in detail below.

In contrast with the teachings of this disclosure, most existing UE geolocation processes estimate call locations based on individual call trace records (timing advance, radio frequency (RF) information, etc.). However, particularly when call durations are short, individual call trace records are of limited utility for meaningful location estimation. For example, most spam calls are not from moving UEs. As a result, each call may be served by a single cell and may report a constant distance (derived from timing advance) to the serving cell during the call. The possible location of such a UE could be anywhere on a circle with a center at the cell location and radius as the distance defined by the timing advance. The accuracy in such a situation can be poor, especially when the radius is large.

By aggregating data from multiple calls according to this disclosure, information from calls made over a long time history as well as calls made from multiple devices can be leveraged to achieve better location detection accuracy.

This disclosure will use mobility E911 emergency services as an example, understanding that other organizations can also make use of the techniques described herein. Mobility E911 calls route to a serving public safety answering point (PSAP) based on the location of the cell site that handles the call. When a burst of uninitiated E911 calls rushes into a PSAP, the burst spams the 911 lines, potentially preventing operators from providing 911 service to normal callers in need of help. These anonymous 911 calls can come from devices without valid subscriber identity module (SIM) cards. Furthermore, the calls may be of short duration (e.g., less than 30s), rendering traditional methods to obtain accurate device locations ineffective.

In such a scenario, there is a need to quickly detect the origin of the calls in order to stop further impact on the PSAP. In some cases, upon detecting location, a physical response can be conducted by police or other personnel. In other cases, the location can help with identifying and contacting the spammer in an effort to thwart the spam calls.

In this disclosure, novel spammer location detection is developed by utilizing existing wireless network measurements and extracted special call features. Embodiments of this disclosure can assist the police department to narrow down a search area including a spammer location. This capability can reduce PSAP downtime caused by call spam and can assist in bringing emergency response systems back to normal. Embodiments disclosed herein can be applied in long term evolution (LTE), fifth generation (5G), or any future generation wireless network technology.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other 4G systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers.

Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
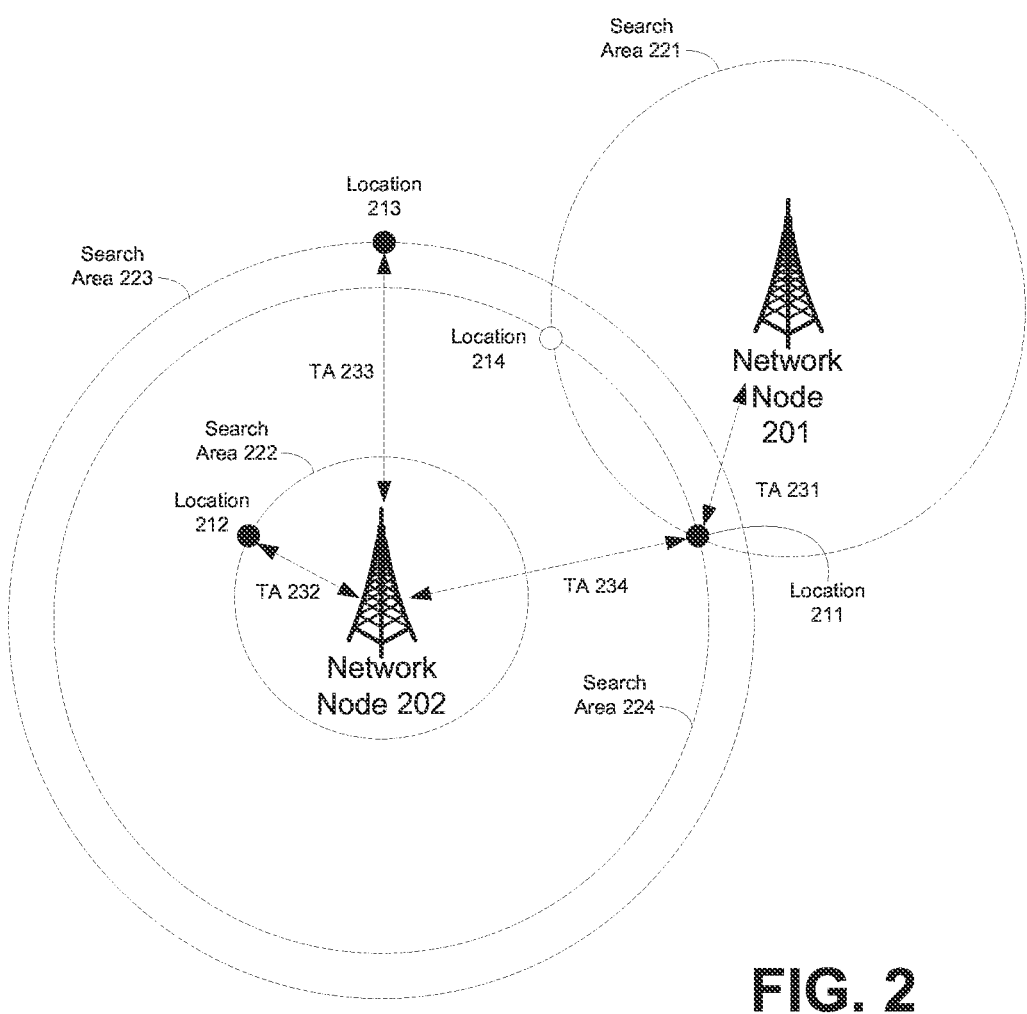
FIG. 2 illustrates example network nodes and timing advance information that can be used to locate an originator of spam calls in a geographical area, in accordance with various aspects and embodiments of the subject disclosure.

FIG. 2 illustrates example network nodes and timing advance information that can be used to locate an originator of spam calls in a geographical area, in accordance with various aspects and embodiments of the subject disclosure. FIG. 2 comprises network nodes 201 and 202 in a geographical area comprising the network nodes 201, 202. FIG. 2 further comprises various example locations 211, 212, 213, and 214, and example timing advance measurements TA 231, TA 232, TA 233, and TA 234 associated with UEs at the locations 211, 212, and 213. FIG. 2 further comprises search areas 221, 222, 223, and 224 that can be derived from the locations of the network nodes and the timing advance values.

In FIG. 2, each of the network nodes 201, 202 can have a known location, and can comprise cells that serve UEs. The UEs are not included in FIG. 2 for simplicity of illustration. Instead, various example UE locations are illustrated, including location 211, location 212, and location 213. The locations 211-213 are not necessarily accurately ascertainable by the network operator. Instead, search areas 221, 222, 223 and 224 can be derived from the locations of network nodes 201, 202 and the timing advance measurements TA 231, TA 232, TA 233, and TA 234. For example, a UE that reports TA 231 and is connected to a cell at network node 201 could be anywhere along the line of search area 221. Similarly, a UE that reports TA 232 and is connected to a cell at network node 202 could be anywhere along the line of search area 222. A UE that reports TA 233 and is connected to a cell at network node 202 could be anywhere along the line of search area 223. A UE that reports TA 234 and is connected to a cell at network node 202 could be anywhere along the line of search area 224.

In an example according to FIG. 2, location 211 can be a spammer location, while locations 212 and 213 are locations of other UEs that are not originators of spam calls. Multiple calls can be originated from the spammer location 211, optionally from multiple different UEs. While each of the multiple calls may be of short duration, e.g., 30 seconds or less, the multiple calls can collectively occur during a longer time period such as one hour or more, one day or more, or one week or more. Techniques described herein can be used to narrow a search area 221 that includes a spammer location 211.

Data from any single call originated from spammer location 211 can enable identification of, e.g., search area 221. However, search area 221 can comprise a large area which is not practical to physically search. Similarly, data from multiple substantially identical calls, each of which uses network node 201 and comprises TA 231, enables identification of search area 221 and is therefore not helpful to narrow the search area 221.

In order to narrow the search area 221, techniques according to this disclosure can identify a shared feature, which is shared by multiple different calls. Data from the multiple different calls that include the shared feature can be aggregated and used to narrow the search area 221, because some of the calls that include the shared feature may use network node 201 and report TA 231, while others of the calls that include the shared feature may use network node 202 and report TA 234. Embodiments of this disclosure can join the search areas 221, 224, thereby narrowing the effective search area down to, e.g., the region of overlap of search areas 221 and 224, and possibly down to location 214 and location 211. Further techniques can optionally be applied to select a best candidate location, e.g., location 211, from among the candidate locations 211 and 214.

Figure 3:
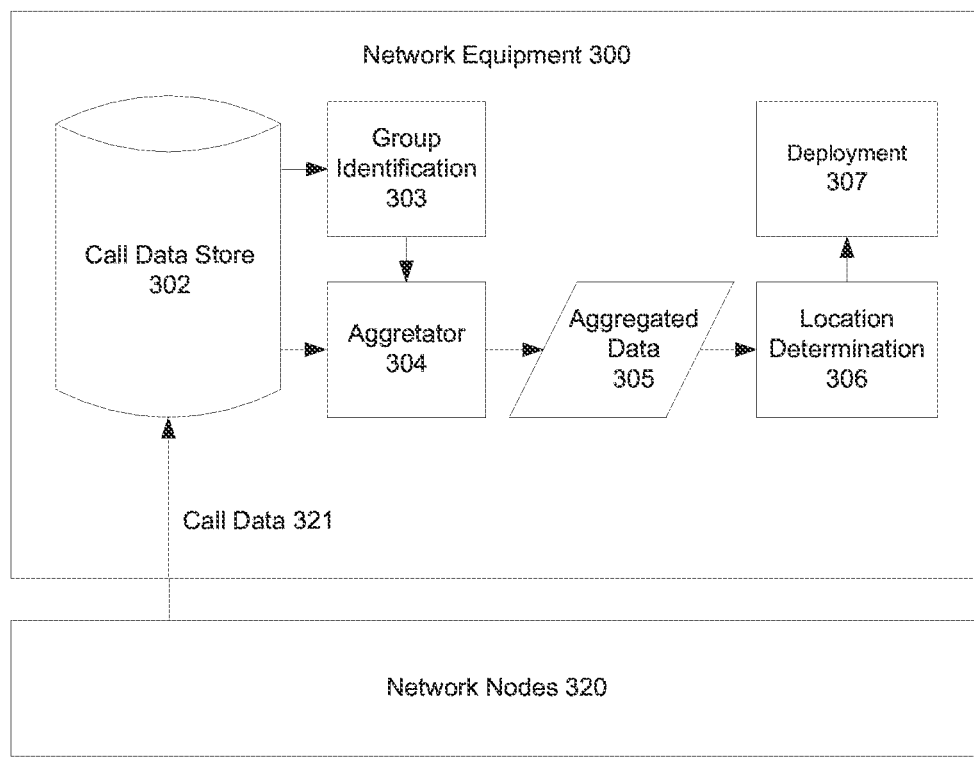
FIG. 3 illustrates example network equipment configured to locate an originator of spam calls in a geographical area, in accordance with various aspects and embodiments of the subject disclosure.

FIG. 3 illustrates example network equipment configured to locate an originator of spam calls in a geographical area, in accordance with various aspects and embodiments of the subject disclosure. FIG. 3 includes example network equipment 300 and example network nodes 320. The network equipment 300 includes call data store 302, group identification 303, aggregator 304, aggregated data 305, location determination 306, and deployment 307. The network nodes 320 supply call data 321 for storage in the call data store 302.

In FIG. 3, the network equipment 300 can implement network equipment in the communication service provider network(s) 106 illustrated in FIG. 1, and the network nodes 320 can implement, e.g., the network node 104 illustrated in FIG. 1, or the network nodes 201, 202 illustrated in FIG. 2. The call data 321 can include, e.g., a caller identification, a callee identification, call duration information, call completion rate information, data and time of call, a serving cell identification, timing advance information, Reference Signal Received Power (RSRP) information, Reference Signal Received Quality (RSRQ) information, and any other information pertaining to UE calls that are served by network nodes 320.

In an example according to FIG. 3, group identification 303 can be configured to scan the call data store 302 to identify calls that share one or more features. Shared features can include any of a wide range of call data. Shared features can include, e.g., similar call duration data, similar caller/call origination information, similar time of day, similar originating device type, similar originating device identifier, similar callee/call destination information, similar serving cell location information, and/or any other features and combinations thereof as may be appropriate for particular embodiments. Group identification 303 can provide shared feature information to the aggregator 304.

The aggregator 304 can be configured to obtain call data, for multiple calls that include the shared feature, from the call data store 302. The obtained call data can include, e.g., all available call data for the multiple calls that include the shared feature, or any defined subset of call data for the multiple calls that include the shared feature. The aggregator 304 can include the obtained call data in aggregated data 305.

Location determination 306 can be configured to process aggregated data 305 to determine a location therefrom. In some embodiments, location determination 306 can be configured to process aggregated data 305 by treating the aggregated data 305 as if it was associated with a single UE or subscriber. For example, location determination 306 can use a first location of first network node and a first timing advance measurement, along with a second location of second (neighbor) network node and a second timing advance measurement, to determine a location, such as by using network node 201 and TA 231, along with network node 202 and TA 234, to determine the location 211 illustrated in FIG. 2.

Deployment 307 can be configured to facilitate deployments to investigate and/or gather further information regarding locations determined by location determination 306. In some embodiments, deployment 307 can output location information for use by physical investigation personnel, such as police or other investigators. In other embodiments, deployment 307 can output location information to mobile cell operators or autonomous vehicles, in order to deploy a mobile cell near a location determined by location determination 306. The mobile cell can gather further call data 321 which can be subsequently used by location determination 306 to improve location estimation accuracy.

Figure 4:
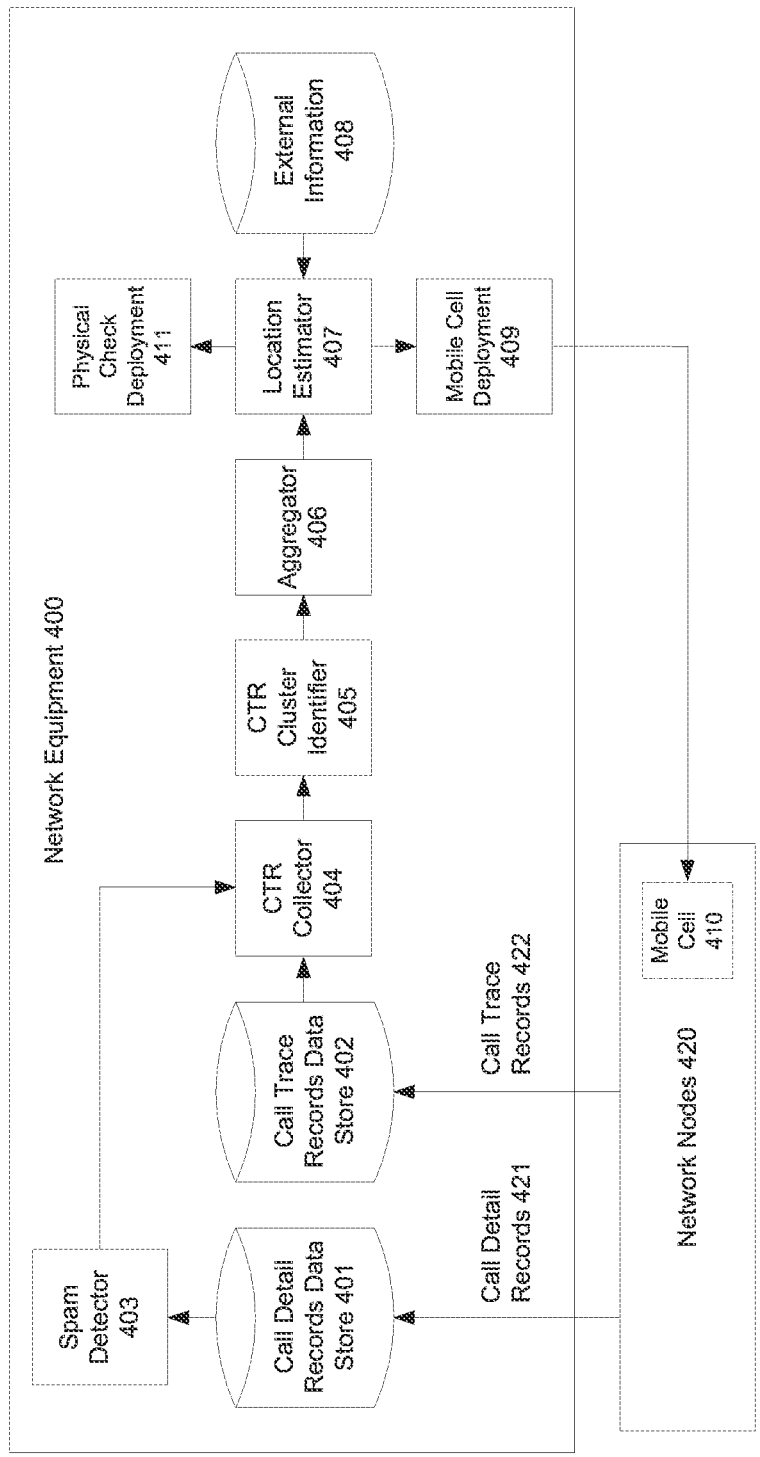
FIG. 4 provides another example embodiment of network equipment configured to locate an originator of spam calls in a geographical area, in accordance with various aspects and embodiments of the subject disclosure.

FIG. 4 provides another example embodiment of network equipment configured to locate an originator of spam calls in a geographical area, in accordance with various aspects and embodiments of the subject disclosure. FIG. 4 includes example network equipment 400 and example network nodes 420. The network equipment 400 comprises call detail records data store 401, call trace records data store 402, spam detector 403, call trace record (CTR) collector 404, CTR cluster identifier 405, aggregator 406, location estimator 407, external information 408, mobile cell deployment 409, and physical check deployment 411. The network nodes 420 comprise mobile cell 410. The network nodes 420 provide call detail records 421 for storage in the call detail records data store 401, and call trace records 422 for storage in the call trace records data store 402.

In an example according to FIG. 4, the call detail records data store 401 can comprise call detail record data, such as caller, callee, duration, completion rate, date/time, etc. Spam detector 403 can be configured to analyze data in the call detail records data store 401 for spam patterns and/or abnormal patterns. Spam patterns can include, e.g., multiple short duration calls, multiple calls that originate from a same geographical area, multiple calls to a same organization, or other patterns. One or more spam pattern criteria can optionally be used to identify spam patterns. Spam detector 403 can alert the CTR collector 404 in response to observing a spam pattern.

In response to an alert by spam detector 403, the CTR collector 404 can be configured to collect, from call trace records data store 402, call trace records of possible spam calls. Call trace records can include, e.g., serving cell, timing advance, RSRP, RSRQ and other attributes/information. In some cases, the collected collect call trace records can be based on a caller identification, however this information may not be available for anonymous calls. In other cases, the collected collect call trace records can be based on, e.g., information such call geographical area, device type/device identifier, and/or call duration/active time from the call detail records. The collected call trace records include richer information measurements pertaining to the possible spam calls, such as serving cell locations, serving cell azimuth, timing advance (which can be used to derive distance from a device to its serving cell), and radio frequency (RF) condition information such as RSRP, RSRQ, etc.

CTR cluster identifier 405 can be configured to cluster similar spam calls/collected call trace records together based on call features indicating a probability of being co-located. For example, spam calls with measurements indicating co-located serving cells and/or nearby serving cells, and similar or related TA and RF values, over long periods of time such as hours, days, weeks or months, can have a probability of having been originated from a same location. CTR cluster identifier 405 can cluster these calls/collected call trace records together.

Aggregator 406 can be configured to aggregate data from a cluster identified by CTR cluster identifier 405. Aggregator 406 can aggregate measurements from spam calls in a cluster in the form of a call history of a single "super-user", that is, treating some or all of the measurements as if they were associated with a single user whose location can be identified by the aggregated data. Aggregator 406 can optionally retain valuable measurements such as serving cells at different locations, different timing advance values, and different RF values, while optionally discarding redundant or unnecessary call data, namely, data that is not used for location determination.

Location estimator 407 can be configured to apply a geo-tagging process, using aggregated measurements produced by aggregator 406. When the aggregated measurements contain serving cells at different locations and corresponding TAs, location estimator 407 can estimate a super-user location at an intersection of circles formed by the cell location and corresponding distances to the super-user. For example, with reference to FIG. 2, location estimator 407 can use the locations of network nodes 201 and 202, and the distances derived from TA 231 and TA232, determine the region of overlap of search areas 221 and 224, or in some embodiments, to determine candidate locations 214 and 211. In some embodiments, location estimator 407 can use arc intersection processing, such as described in connection with FIG. 6. In some embodiments, location estimator 407 can apply techniques disclosed herein to select a location, e.g., location 211, from among candidate locations 214 and 211.

Location estimator 407 can furthermore optionally use external information 408 in connection with determining locations. External information 408 can optionally include, e.g., business type information (such as whether businesses are technology, health, or other business types) of businesses located in a serving area. External information 408 can optionally include geographic information, such as locations of roads, buildings, parks, etc. in a serving area. External information 408 can optionally include event information such as sporting events, concerts, or other events which may be related to high call volume in a serving area. Location estimator 407 can use external information 408 to narrow down a search area, and optionally, to identify particular addresses or organizations.

Figure 5:
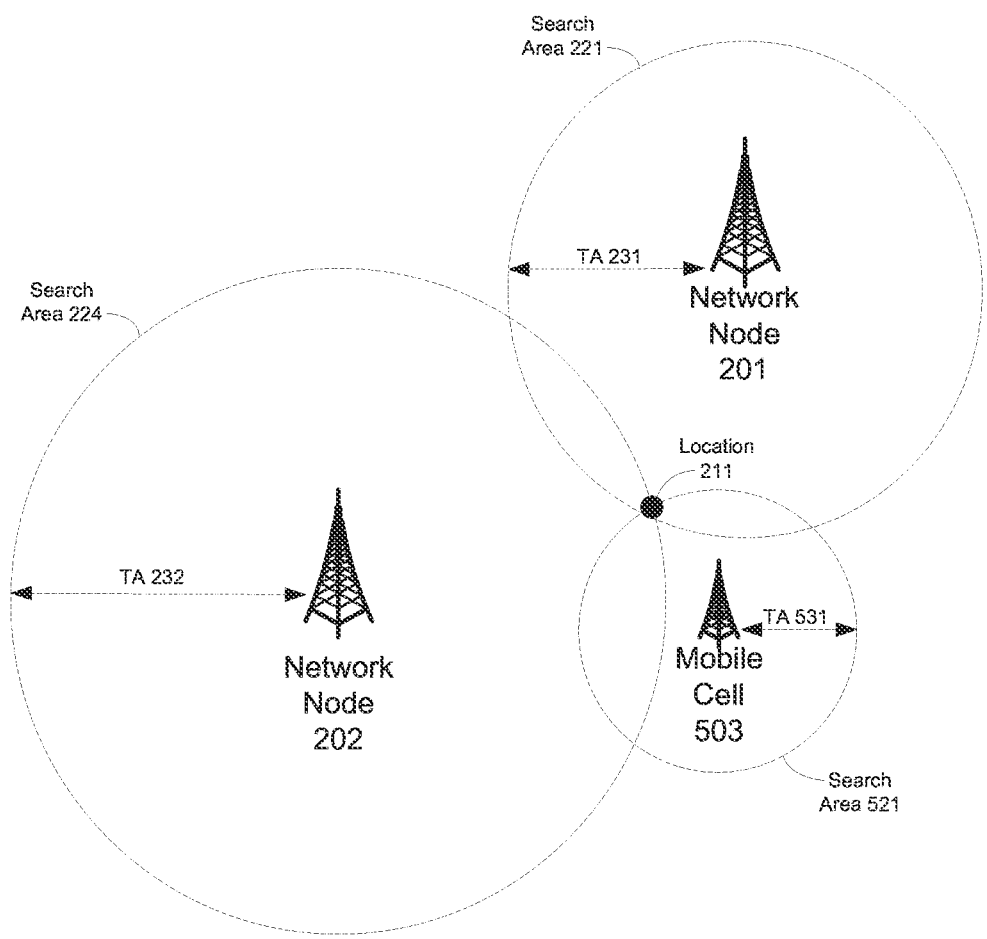
FIG. 5 illustrates a mobile cell deployed into a geographical area to gather further information to locate an originator of spam calls in a geographical area, in accordance with various aspects and embodiments of the subject disclosure.

Mobile cell deployment 409 can be configured to deploy one or more mobile cells 410 to a search area, in order to collect additional cellular network data, e.g., additional call detail records 421 and additional call trace records 422, for use in locating a spam caller. A mobile cell 410 can comprise, e.g., a "cell on wheels," such as a vehicle equipped with a network node, or other mobile or temporary RAN equipment. In response to a location estimated by location estimator 407 being unsatisfactory, e.g., by containing a large search area that exceeds a size criterion and so is impractical to physically investigate, mobile cell deployment 409 can facilitate deployment of a mobile cell 410 within a geographical area. Once subsequent spam calls are initialized via the mobile cell, distances between devices and the mobile cell can be measured and collected in the call trace records data store 402. Mobile cell locations and timing advance measurements can allow definition of new search areas, as illustrated in FIG. 5, and the new search areas can be used in conjunction with existing search areas to estimate locations more accurately. If needed, mobile cell locations can be moved to collect multiple measurements and further improve accuracy.

Physical check deployment 411 can be configured to facilitate a physical investigation of a location identified by location estimator 407. Physical check deployment 411 can be activated when the location(s) identified by location estimator 407 meet or exceed an accuracy criterion, while mobile cell deployment 409 can be activated when the location(s) identified by location estimator 407 do not meet the accuracy criterion. A physical check can include a call to identified organization(s) at an identified location, or a visit by personnel to the location to investigate.

Embodiments of this disclosure can detect the origins of spam calls by clustering spam calls based on call features such as serving cell attributes, distance to serving cells, device types, call active periods etc. The disclosed process aggregates call trace history of devices in a cluster to conduct location estimation with geo location techniques. Embodiments can also correlate external information such as business type, clutter information, special events and traffic flows to narrow down the investigation area.

Furthermore, when measurements cannot lead to location estimation with sufficient accuracy, embodiments can leverage mobile cell sites such as a cell on wheels as reference point assistants. Embodiments can utilize the flexibility of a cell on wheels to provide new access points to spam calls and to collect call trace measurements to derive the distance from devices to new cell on wheels location(s). Each pair of serving cell location and device distance to the serving cell provides a circle of possible locations on map. The intersection of multiple circles formed by a cell on wheels and an original serving cell reveals the location of spam calls. To avoid interference on the existing network, a cell on wheels can optionally use a small cell with a different frequency from the permanently installed cells in a geographic area.

With the help of an aggregated call trace history of spam calls in a cluster, external geographical information and access point assistance via a mobile cell, spammer locations can be estimated quickly and effectively in a reasonably short time. Embodiments can facilitate search efforts of police departments and restoration of E911 PSAP service. Embodiments can also be generalized to identify the location of any robo-caller or other caller making high frequency calls via LTE or 5G networks.

FIG. 5 illustrates a mobile cell deployed into a geographical area to gather further information to locate an originator of spam calls in a geographical area, in accordance with various aspects and embodiments of the subject disclosure. FIG. 5 includes network nodes 201, 202, TA 231, TA 232, search area 221, search area 224, and location 211, introduced in FIG. 2. FIG. 5 furthermore includes a mobile cell 503, a TA 531, and a search area 521.

In an example according to FIG. 5, when network equipment, such as network equipment 400 illustrated in FIG. 4, cannot determine a spammer location 211 with sufficient accuracy, as may be determined with reference to a desired accuracy criterion, the mobile cell deployment 409 can deploy a mobile cell 410 into a region of the spammer location 211.

The mobile cell 503 illustrated in FIG. 5 can implement the mobile cell 410 introduced in FIG. 4. Mobile cell 503 can serve additional calls made from the spammer location 211, and at least some of these additional calls may include the same feature(s) as other spam calls made from the location 211. The resulting call data from mobile cell 503 can be aggregated with call data from other spam calls e.g., calls that used network nodes 201 and/or 202.

The call data from calls that made use of mobile cell 503 can be used to determine search area 521. For example, the location of mobile cell 503 when handling a spam call, and the TA 531 associated with the spam call, can be used to determine search area 521. The search area 521 can then be combined with search areas 221 and/or 222 in order to refine the estimation of location 211.

Figure 6:
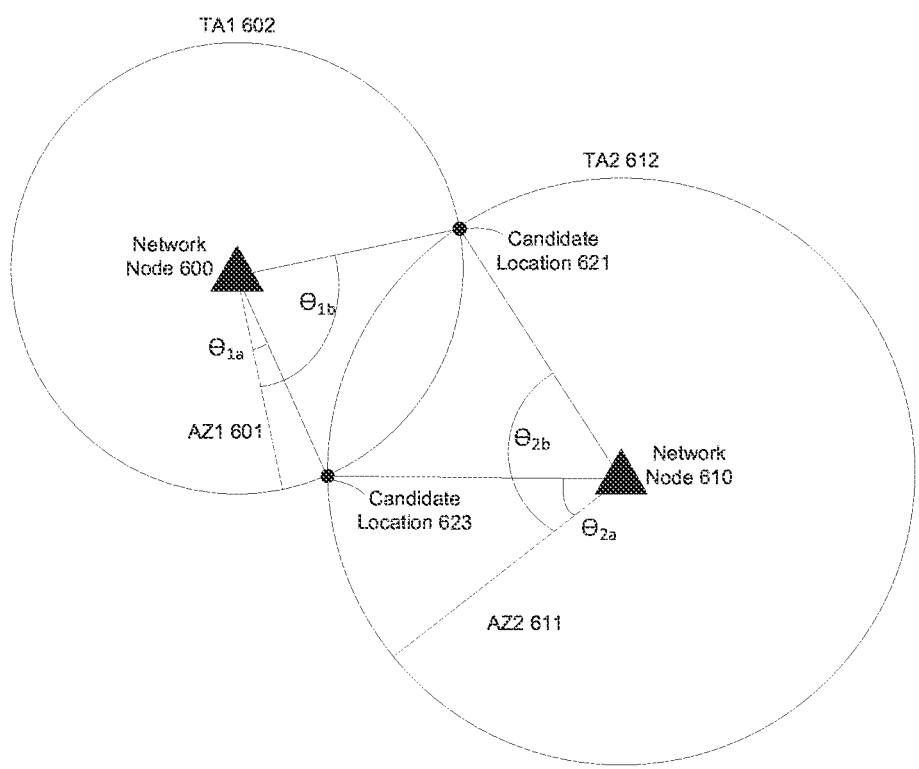
FIG. 6 illustrates arc intersection processing to locate an originator of spam calls in a geographical area, in accordance with various aspects and embodiments of the subject disclosure.

FIG. 6 illustrates arc intersection processing to locate an originator of spam calls in a geographical area, in accordance with various aspects and embodiments of the subject disclosure. FIG. 6 illustrates a network node 600 and a network node 610. A timing advance TA1 602 is observed for a UE when the UE is connected to a serving cell at network node 600, and a timing advance TA2 612 is observed for the UE when the UE is connected to a serving cell at network node 610. TA1 602 defines first circle (arc) of possible locations, and TA2 612 defines second circle (arc) of possible locations. The intersections of these arcs are candidate locations 621, 623 of the UE, if the UE is presumed to be at a same location when connected to either of the network nodes 600, 610.

In FIG. 6, an angle $\theta_{1b}$ is defined by network node 600 and candidate locations 621, 623. An angle $\theta_{1a}$ is the angle between an azimuth AZ1 601 of the serving cell at network node 600, and the line between network node 600 and candidate location 623. An angle $\theta_{2b}$ is defined by network node 610 and candidate locations 621, 623. An angle $\theta_{2a}$ is the angle between an azimuth AZ2 611 of the serving cell at network node 610, and the line between network node 610 and candidate location 623. In the illustrated example, AZ1 601 is 135 degrees, and AZ2 611 is 225 degrees.

In an example candidate location selection, the candidate location with the smaller average angle difference $(\theta_1+\theta_2)/2$ can be selected. Therefore in the example provided by FIG. 6, candidate location 623 can be selected as the location of the UE, because $(\theta_{1a}+\theta_{2a})/2$ is smaller than $(\theta_{1b}+\theta_{2b})/2$.

In general, given paired measurements: (cell, azimuth, TA, cell neighbor, azimuth neighbor, TA neighbor), an arc intersection process can be performed on each pair. In the arc intersection process, a circle_A can be defined using the cell location as the center and TA converted distance as the radius, and a circle_B can be defined using cell neighbor location as the center and TA neighbor converted distance as the radius. The TA to radius conversion formula can comprise, e.g., radius=(raw TA/16-delta)*78. The delta can be used to correct the rounding effects in TA reports. An example delta can be 0.5.

Next, the intersections of circle_A and circle_B can be computed. If there exist two intersections (sol1, sol2), then each sol can be lined up with the centers of two circles (i.e. cell locations) and the angle between the line and cell azimuths can be calculated. The intersection with smaller angles can be selected as the arc intersection solution. If there exists only one intersection between the circles, then the one intersection can be used as the arc intersection solution.

Next, cross validation can optionally be performed by selecting a most reliable arc intersection solution if (cell, TA) has multiple paired measurements. This can be done, e.g., by picking the intersection corresponding to the minimal TA to cell neighbor, or by picking the intersection with the minimal mean squared of (TA—Distance) to each cell neighbor.

Figure 7:
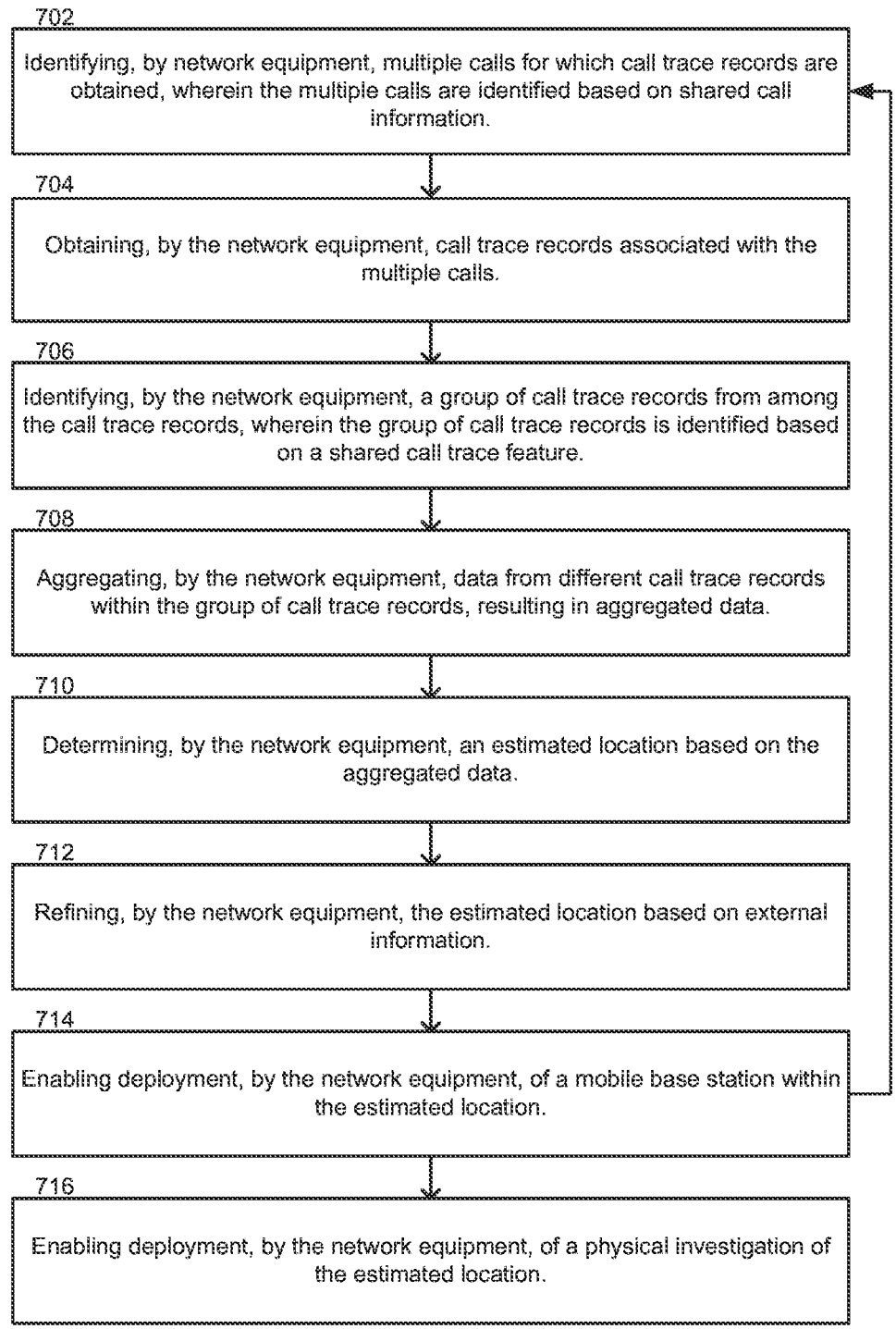
FIG. 7 is a flow diagram representing example operations of network equipment in connection with determining an estimated location of an originator of spam calls, in accordance with various aspects and embodiments of the subject disclosure.

FIG. 7 is a flow diagram representing example operations of network equipment in connection with determining an estimated location of an originator of spam calls, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network equipment 400 such as illustrated in FIG. 4. Example operation 702 comprises identifying, e.g., by the network equipment 400, multiple calls for which call trace records are obtained, wherein the multiple calls are identified based on shared call information. Operation 702 can be performed by spam detector 403. The shared call information can comprise, e.g., at least one of a call detailed record property, a caller identifier, a call recipient identifier, call duration information, a caller device type, or a caller device identifier. In some embodiments, the multiple calls can comprise calls that occurred at different times during a defined call history interval, e.g., during the previous day, two days, week, or month. In some embodiments, the multiple calls can comprise calls that originate from different respective user equipment devices.

Example operation 704 comprises obtaining, by the network equipment 400, call trace records associated with multiple calls identified at operation 702. Example operation 704 can be performed by CTR collector 404. Example operation 706 comprises identifying, by the network equipment 400, a group of call trace records from among the call trace records (e.g., from among the call trace records obtained at operation 704), wherein the group of call trace records is identified based on a shared call trace feature. Example operation 706 can be performed by CTR cluster identifier 405. The shared call trace feature can comprise, e.g., at least one of cell group information, cell azimuth group information, timing advance group information, reference signal received power group information, or reference signal received quality group information.

Example operation 708 comprises aggregating, by the network equipment 400, data from different call trace records within the group of call trace records, resulting in aggregated data. For example, the aggregator 406 can aggregate data from different call trace records within the group of call trace records identified at operation 706, resulting in aggregated data. The aggregated data can comprise, e.g., identifications of serving cells such as cells at network nodes 201 and 202 illustrated in FIG. 2. The aggregated data can also comprise, e.g., timing advance information associated with the serving cells, such as TA 231 and TA234 illustrated in FIG. 2.

Example operation 710 comprises determining, by the network equipment 400, an estimated location based on the aggregated data. For example, location estimator 407 can determine an estimated location based on the aggregated data assembled by aggregator 406. In some embodiments, determining the estimated location can comprise determining an overlap region based on serving cells identified in the aggregated data. In some embodiments, determining the estimated location can comprise determining the overlap region based on the timing advance information, e.g., TA 231, TA234, and serving cells at nodes 201, 202. The estimated location can comprise a specific location, multiple specific locations, or a search region.

Example operation 712 comprises refining, by the network equipment 400, the estimated location based on external information. For example, location estimator 407 can refine its estimated location based on external information 408 comprising at least one of business information within the estimated location, geographic information within the estimated location, or event information within the estimated location.

Example operation 714 comprises enabling deployment, by the network equipment 400, of a mobile base station within the estimated location. For example, mobile cell deployment 409 can provide information to a mobile cell transport vehicle, directing the mobile cell transport vehicle to transport the mobile cell 410 to a location in or near the estimated location determined at operation 710. The operations of FIG. 7 can be repeated after the mobile cell 410 has had an opportunity to service calls from the location to which the mobile cell 410 was deployed.

Example operation 716 comprises enabling deployment, by the network equipment 400, of a physical investigation of the estimated location. For example, physical check deployment 411 can provide information to police or other investigating personnel, directing the personnel to investigate the location determined at operation 710.

FIG. 8 is a flow diagram representing another set of example operations of network equipment in connection with determining an estimated location of an originator of spam calls, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network equipment 300 such as illustrated in FIG. 3. Example operation 802 comprises aggregating data from different call trace records within a group of call trace records, resulting in aggregated data 305, wherein the aggregated data 305 comprises identifications of serving cells. The aggregated data 305 can further comprise timing advance information associated with the serving cells.

The group of call trace records can comprise, e.g., a shared call trace feature comprising at least one of cell group information, cell azimuth group information, timing advance group information, reference signal received power group information, and reference signal received quality group information. The group of call trace records can be associated with calls which occurred at different times during a call history interval, and the calls can originate from different user equipment.

Example operation 804 comprises determining an estimated location based on the aggregated data 305, wherein determining the estimated location comprises determining an overlap region based on the serving cells. Determining the estimated location can further comprise determining the overlap region based on the timing advance information and the serving cells, as can be understood by reference to FIG. 2.

FIG. 9 is a flow diagram representing example operations of network equipment in connection with deploying a mobile cell to determine an estimated location of an originator of spam calls, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment 400 such as illustrated in FIG. 4. Example operation 902 comprises determining an estimated location based on first aggregated data, wherein the first aggregated data is based on different call trace records comprising a shared call trace feature. For example, aggregator 406 can produce the first aggregated data, and the location estimator 407 can determine the estimated location based thereon.

The different call trace records can optionally be associated with calls which occurred at different times during a call history interval, and the calls can optionally have originated from different user equipment. The shared call trace feature can comprise, e.g., at least one of cell group information, cell azimuth group information, timing advance group information, reference signal received power group information, and reference signal received quality group information.

Example operation 904 comprises enabling deployment of a mobile base station towards the estimated location in order to obtain additional call trace records comprising the shared call trace feature. For example, mobile cell deployment 409 can enable deployment of mobile cell 410, e.g., by providing location information directing mobile cell 410 to the estimated location. Mobile cell 410 can be a cell implemented by a mobile base station.

Example operation 906 comprises including the additional call trace records in the first aggregated data, resulting in second aggregated data. For example, data from calls handled by mobile cell 410 can be included in call trace records 422. Some of this additional data can be included by aggregator 406 in the second aggregated data. The second aggregated data can comprise, e.g., identifications of serving cells, the serving cells including a cell enabled by the mobile base station.

Example operation 908 comprises refining the estimated location based on the second aggregated data. For example, location estimator 407 can use the second aggregated data to make a more accurate location estimate. In some embodiments, refining the estimated location based on the second aggregated data can comprise determining an overlap region based on the serving cells, e.g., as can be understood by reference to FIG. 5.

Figure 10:
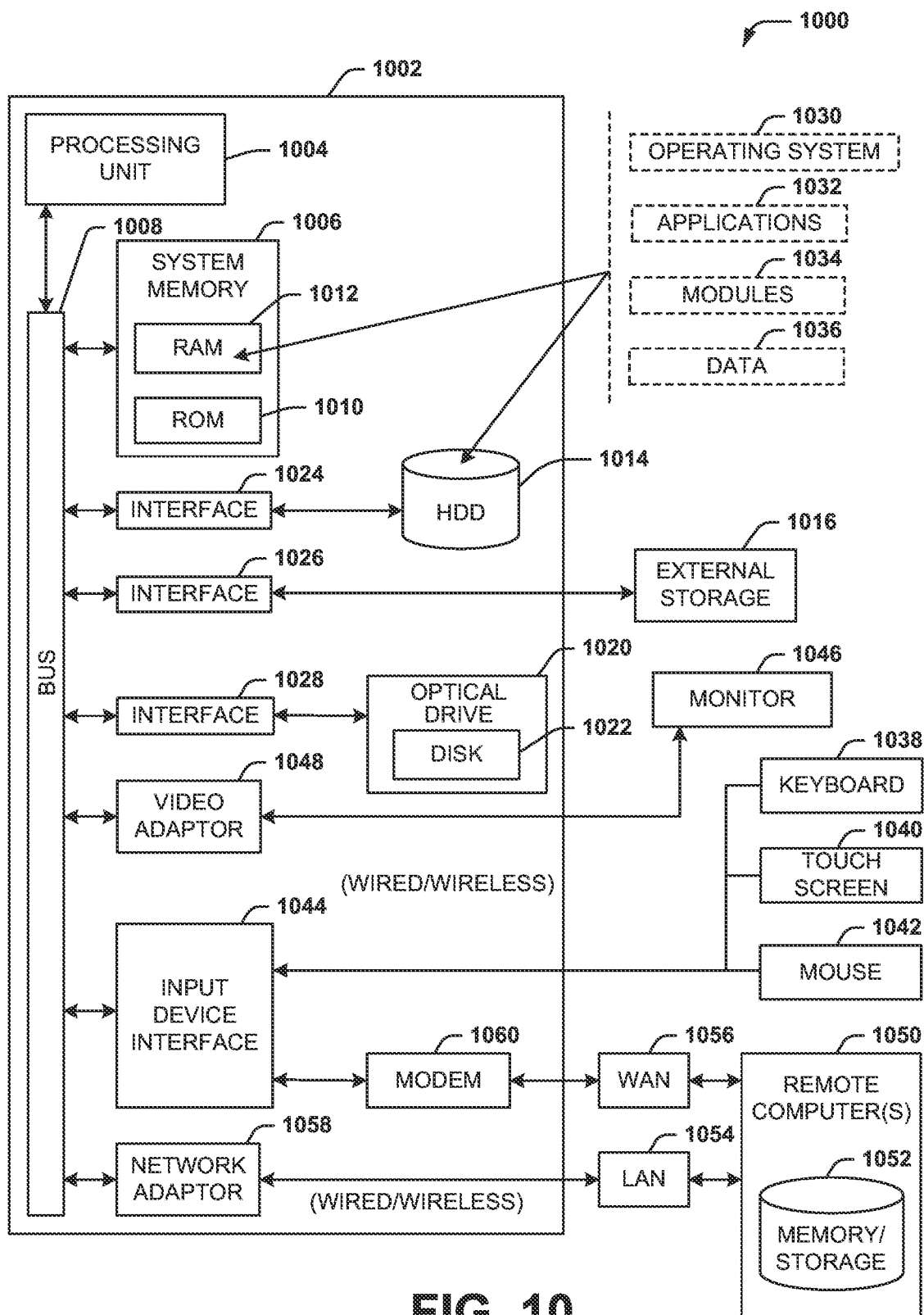
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by network equipment comprising a processor, spam patterns in call detail records data, wherein the spam patterns comprise one or more of multiple short duration calls, multiple calls that originate from a same geographical area, and multiple calls to a same organization;
   obtaining, by the network equipment, call trace records associated with multiple calls, wherein the obtaining is responsive to the identifying the spam patterns in call detail records data;
   identifying, by the network equipment, a group of call trace records from among the call trace records, wherein the group of call trace records is identified based on a shared call trace feature;
   aggregating, by the network equipment, data from different call trace records within the group of call trace records, resulting in aggregated data; and
   determining, by the network equipment, an estimated location based on the aggregated data.

2. The method of claim 1, further comprising identifying, by the network equipment, the multiple calls for which the call trace records are obtained, wherein the multiple calls are identified based on shared call information.

3. The method of claim 2, wherein the shared call information comprises at least one of a call detailed record property, a caller identifier, a call recipient identifier, call duration information, a caller device type, or a caller device identifier.

4. The method of claim 1, wherein the shared call trace feature comprises at least one of cell group information, cell azimuth group information, timing advance group information, reference signal received power group information, or reference signal received quality group information.

5. The method of claim 1, wherein the aggregated data comprises identifications of serving cells, and wherein determining the estimated location comprises determining an overlap region based on the serving cells.

6. The method of claim 5, wherein the aggregated data comprises timing advance information associated with the serving cells, and wherein determining the estimated location comprises determining the overlap region based on the timing advance information and the serving cells.

7. The method of claim 1, wherein calls of the multiple calls occurred at different times during a defined call history interval.

8. The method of claim 1, wherein the estimated location comprises a search region.

9. The method of claim 1, further comprising refining, by the network equipment, the estimated location based on external information comprising at least one of business information within the estimated location, geographic information within the estimated location, or event information within the estimated location.

10. The method of claim 1, further comprising enabling deployment, by the network equipment, of a mobile base station within the estimated location, the mobile base station configured to detect information to improve accuracy of the estimated location.

11. The method of claim 1, further comprising enabling deployment, by the network equipment, of a physical investigation of the estimated location.

12. The method of claim 1, wherein the multiple calls originate from respective user equipment.

13. Network equipment, comprising:
a processor; and
a memory that stores executable instructions that, when executed by the processor, facilitate performance of operations, comprising:
identifying spam patterns in call record data for user calls in a wireless communication system;
aggregating data from different call trace records within a group of call trace records, resulting in aggregated data, wherein the aggregated data comprises identifications of serving cells, wherein the aggregating is responsive to identifying the spam patterns in the call record data; and
determining an estimated location based on the aggregated data, wherein determining the estimated location comprises determining an overlap region based on the serving cells.

14. The network equipment of claim 13, wherein the group of call trace records comprises a shared call trace feature comprising at least one of cell group information, cell azimuth group information, timing advance group information, reference signal received power group information, and reference signal received quality group information.

15. The network equipment of claim 13, wherein the group of call trace records are associated with calls which occurred at different times during a call history interval, and wherein the calls originated from different user equipment.

16. The network equipment of claim 13, wherein the aggregated data comprises timing advance information associated with the serving cells, and wherein determining the estimated location comprises determining the overlap region based on the timing advance information and the serving cells.

17. A non-transitory machine-readable medium, comprising executable instructions that, when executed by a processor, facilitate performance of operations, comprising:

identifying abnormal patterns in call data for calls in a wireless communication system;

aggregating data from different call trace records within a group of call trace records, wherein the group of call trace records is identified based on a shared call trace feature, forming first aggregated data;

determining an estimated location based on the first aggregated data;

enabling deployment of a mobile base station towards the estimated location in order to obtain additional call trace records comprising the shared call trace feature;

including the additional call trace records in the first aggregated data, resulting in second aggregated data; and refining the estimated location based on the second aggregated data.

18. The non-transitory machine-readable medium of claim 17, wherein the different call trace records are associated with calls which occurred at different times during a call history interval, and wherein the calls originated from different user equipment.

19. The non-transitory machine-readable medium of claim 17, wherein the shared call trace feature comprises at least one of cell group information, cell azimuth group information, timing advance group information, reference signal received power group information, and reference signal received quality group information.

20. The non-transitory machine-readable medium of claim 17, wherein the second aggregated data comprises identifications of serving cells, the serving cells including a cell enabled by the mobile base station, and wherein refining the estimated location based on the second aggregated data comprises determining an overlap region based on the serving cells.

* * * * *